(12) United States Patent
Inden et al.

(10) Patent No.: US 11,964,714 B2
(45) Date of Patent: Apr. 23, 2024

(54) STEERING CONTROL APPARATUS

(71) Applicant: JTEKT CORPORATION, Osaka (JP)

(72) Inventors: Yuki Inden, Okazaki (JP); Terutaka Tamaizumi, Okazaki (JP)

(73) Assignee: JTEKT CORPORATION, Osaka (JP)

( * ) Notice: Subject to any disclaimer, the term of this patent is extended or adjusted under 35 U.S.C. 154(b) by 163 days.

(21) Appl. No.: 17/190,565

(22) Filed: Mar. 3, 2021

(65) Prior Publication Data

US 2021/0276616 A1 Sep. 9, 2021

(30) Foreign Application Priority Data

Mar. 9, 2020 (JP) ................................ 2020-039937

(51) Int. Cl.
| | | |
|---|---|---|
| *B62D 5/04* | (2006.01) | |
| *B62D 1/28* | (2006.01) | |
| *B62D 5/00* | (2006.01) | |
| *B62D 6/00* | (2006.01) | |
| *B62D 6/10* | (2006.01) | |

(52) U.S. Cl.
CPC .............. *B62D 6/008* (2013.01); *B62D 5/006* (2013.01); *B62D 5/0481* (2013.01)

(58) Field of Classification Search
None
See application file for complete search history.

(56) References Cited

U.S. PATENT DOCUMENTS

| | | | | |
|---|---|---|---|---|
| 2003/0050748 A1* | 3/2003 | Iwazaki | ................. | B62D 1/286 180/443 |
| 2012/0259512 A1* | 10/2012 | Okada | ................. | B62D 5/0481 701/41 |
| 2019/0161116 A1* | 5/2019 | Moreillon | ................ | B62D 6/00 |
| 2019/0300044 A1 | 10/2019 | Tsubaki | | |
| 2019/0329818 A1* | 10/2019 | Shoji | ..................... | B62D 6/002 |

FOREIGN PATENT DOCUMENTS

| | | | | |
|---|---|---|---|---|
| JP | 2017229229 | * | 11/2017 | ............. B62D 15/02 |
| JP | 2018086452 | * | 4/2018 | ............... B62D 5/04 |
| JP | 2018-183046 A | | 11/2018 | |

OTHER PUBLICATIONS

Aug. 2, 2021 Extended Search Report issued in European Patent Application No. 21160725.4.

* cited by examiner

*Primary Examiner* — Jonathan M Dager
*Assistant Examiner* — Laura E Linhardt
(74) *Attorney, Agent, or Firm* — Oliff PLC

(57) ABSTRACT

A steering control apparatus controls a motor used to turn a steered wheel of a vehicle, which synchronizes with a steering wheel, based on a command value. The steering control apparatus includes an electronic control unit. The electronic control unit is configured to compute a feedback control torque to be reflected in the command value. The electronic control unit is configured to compute a disturbance torque based on the feedback control torque and a predetermined angle. The electronic control unit is configured to correct the feedback control torque by using the disturbance torque. The electronic control unit is configured to correct the command value reflecting the corrected feedback control torque, based on an applied torque.

4 Claims, 4 Drawing Sheets

STEERING CONTROL APPARATUS

CROSS-REFERENCE TO RELATED APPLICATION

This application claims priority to Japanese Patent Application No. 2020-039937 filed on Mar. 9, 2020, incorporated herein by reference in its entirety.

BACKGROUND

1. Technical Field

The invention relates to a steering control apparatus.

2. Description of Related Art

There is known a control apparatus that controls an electric power supplied to a motor used to control an autonomous driving system, a driving support system, or a steering system, such as a steer-by-wire system. For example, a control apparatus of Japanese Unexamined Patent Application Publication No. 2018-183046 (JP 2018-183046 A) computes a target motor torque (target automatic steering torque) based on a target turning angle set by a control apparatus for autonomous driving control, and computes a target motor current by dividing the computed target motor torque by a torque constant of a motor. The control apparatus feeds back a current supplied to the motor to bring a motor current detected through a current detection circuit into coincidence with the target motor current.

The control apparatus of JP 2018-183046 A includes a disturbance observer. The disturbance observer estimates a disturbance torque based on a rotation angle of the motor, detected through a rotational angle sensor, and the target motor torque computed based on the target turning angle. A disturbance torque is a torque other than a motor torque that affects a turning angle. The control apparatus computes a target motor torque by using the disturbance torque computed by the disturbance observer. Higher-accuracy motor control is achieved by compensating the disturbance torque.

SUMMARY

However, in the control apparatus of JP 2018-183046 A, there are the following concerns. When, for example, autonomous driving control is being executed, an entity that operates a steering wheel is not a driver and is a control apparatus for autonomous driving control. For this reason, it is conceivable that a driver does not actively operate the steering wheel and drives a vehicle in a hand-off state where hands are off the steering wheel. In this hand-off state, resonance may occur in a specific frequency range due to the inertia of the steering wheel. With an increase in difference between the frequency characteristics of a vehicle plant including the steering system and the frequency characteristics of a nominal plant (model simulating the steering system) of a disturbance observer as a result of occurrence of the resonance, there are concerns about a decrease in the follow-up performance of an actual turning angle for a target turning angle.

The invention ensures the follow-up performance of an actual angle for a target angle.

An aspect of the invention relates to a steering control apparatus. The steering control apparatus controls a motor used to turn a steered wheel of a vehicle, which synchronizes with a steering wheel, based on a command value. The command value is computed according to a target angle of an angle convertible to a wheel steering angle of the steered wheel, and the target angle is determined by an onboard host control apparatus. The steering control apparatus includes an electronic control unit. The electronic control unit is configured to compute a feedback control torque to be reflected in the command value through execution of feedback control. The feedback control is control to cause a predetermined angle to follow the target angle. The predetermined angle is the angle convertible to the wheel steering angle and detected through a first sensor. The electronic control unit is configured to compute a disturbance torque based on the computed feedback control torque and the predetermined angle. The disturbance torque is a torque that affects the predetermined angle and that is other than a torque to be generated by the motor. The electronic control unit is configured to correct the computed feedback control torque by using the computed disturbance torque. The electronic control unit is configured to correct the command value reflecting the corrected feedback control torque, based on an applied torque. The applied torque is a torque to be applied to the steering wheel and detected through a second sensor.

When control over the motor based on a target angle determined by a host control apparatus is being executed, an entity that operates the steering wheel is not a driver and is the host control apparatus. For this reason, it is conceivable that a driver does not actively operate the steering wheel and drives a vehicle in a hand-off state where hands are off the steering wheel. In this hand-off state, resonance may occur in a specific frequency range due to the inertia of the steering wheel. With an increase in difference between the frequency characteristics of a vehicle plant including an actual plant to be controlled by a steering control apparatus and the frequency characteristics of a nominal plant of a disturbance observer as a result of occurrence of the resonance, there are concerns about a decrease in the follow-up performance of an actual angle for a target angle.

In this regard, with the above configuration, when control over the motor based on a target angle determined by a host control apparatus is being executed, for example, when the vehicle is traveling in a hand-off state, a torque caused by the inertia of the steering wheel is detected through the second sensor. The command value reflecting the feedback control torque corrected by the electronic control unit is corrected based on the detected inertia torque of the steering wheel, so a final command value for which the inertia torque of the steering wheel is compensated is obtained. The motor is controlled based on the final command value, so the follow-up performance of an actual angle for a target angle is ensured.

In the steering control apparatus, the electronic control unit may be configured to subtract the applied torque from the command value reflecting the corrected feedback control torque.

With the above configuration, a final command value for which the inertia torque of the steering wheel is compensated is obtained. In the steering control apparatus, the electronic control unit may be configured to subtract the applied torque from the computed disturbance torque.

With the above configuration, a disturbance torque for which the inertia torque of the steering wheel is compensated is obtained. Therefore, a feedback control torque corrected by the disturbance torque and, by extension, a command value reflecting the corrected feedback control torque are the ones for which the inertia torque of the steering wheel is compensated.

In the steering control apparatus, the electronic control unit may be configured to compute a feedforward control torque based on a second time derivative of the target angle. The electronic control unit may be configured to subtract the disturbance torque from a value obtained by adding the feedforward control torque to the feedback control torque.

With the above configuration, when the motor is controlled by using the feedforward control torque, the response of motor control is further increased.

With the above configurations, the follow-up performance of an actual angle for a target angle is ensured.

BRIEF DESCRIPTION OF THE DRAWINGS

Features, advantages, and technical and industrial significance of exemplary embodiments of the invention will be described below with reference to the accompanying drawings, in which like signs denote like elements, and wherein.

DETAILED DESCRIPTION OF EMBODIMENTS

Figure 1:
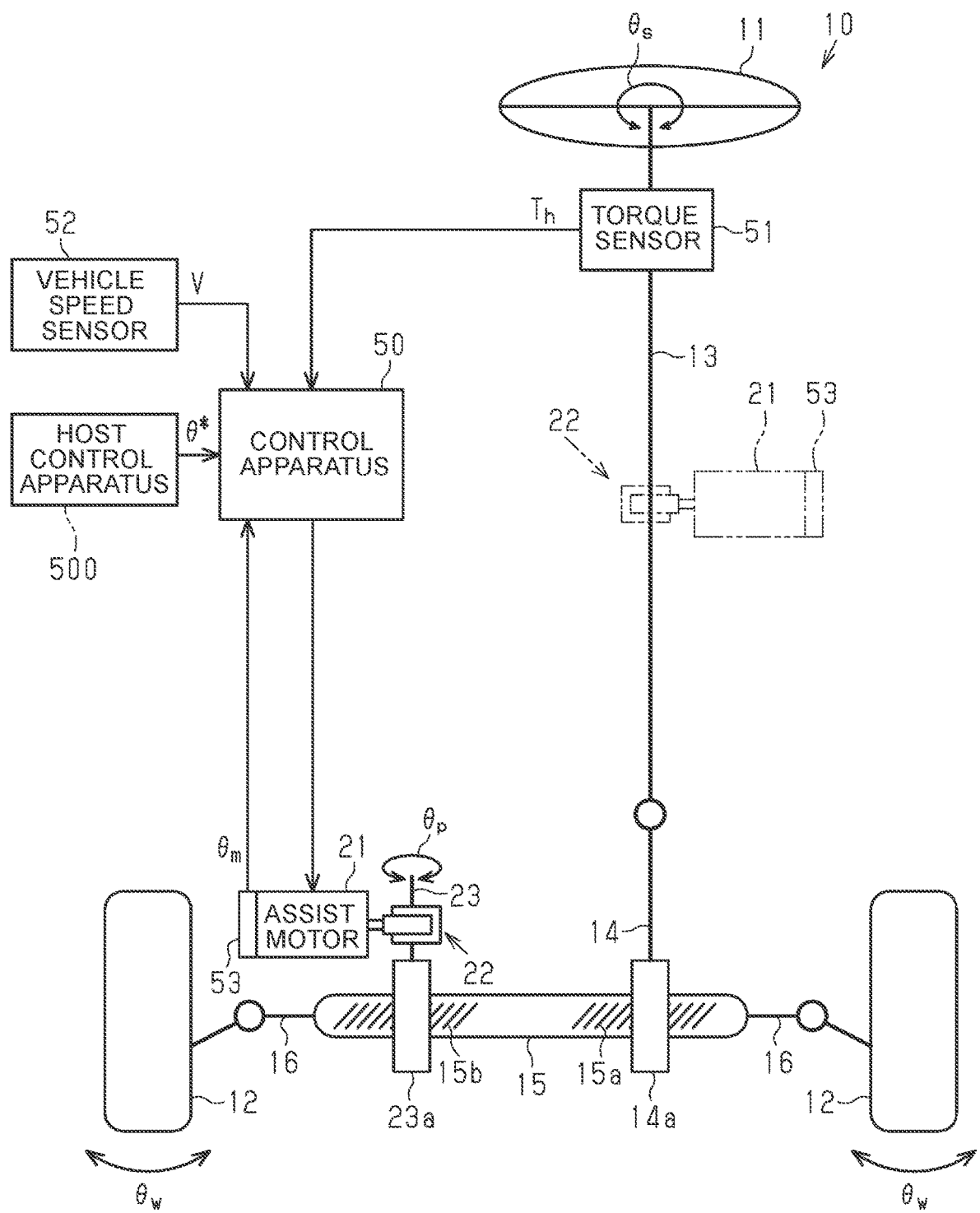
FIG. 1 is a configuration diagram of an electric power steering in which a steering control apparatus according to an embodiment is installed.

Hereinafter, a first embodiment in which a steering control apparatus is implemented as a control apparatus of an electric power steering (EPS) will be described. As shown in FIG. 1, the EPS 10 includes a steering shaft 13, a pinion shaft 14, and a wheel steering shaft 15, as a power transmission path between a steering wheel 11 and a pair of steered wheels 12. The wheel steering shaft 15 extends along a vehicle width direction (right and left direction in FIG. 1). The steered wheels 12 are respectively coupled to both ends of the wheel steering shaft 15 via tie rods 16. The pinion shaft 14 is provided so as to intersect with the wheel steering shaft 15. Pinion teeth 14a of the pinion shaft 14 are meshed with rack teeth 15a of the wheel steering shaft 15. The wheel steering shaft 15 linearly moves with a rotating operation of the steering wheel 11. The linear motion of the wheel steering shaft 15 is transmitted to the right and left steered wheels 12 via the tie rods 16, with the result that a wheel steering angle $\theta_t$ of the steered wheels 12 is changed.

The EPS 10 includes a motor 21 and a speed reduction mechanism 22 as components to generate an assisting force that is a force to assist a driver in steering. The motor 21 functions as an assist motor that is a source to generate an assisting force. For example, a three-phase brushless motor is employed as the motor 21. The motor 21 is coupled to the pinion shaft 23 via the speed reduction mechanism 22. Pinion teeth 23a of the pinion shaft 23 are meshed with rack teeth 15b of the wheel steering shaft 15. Rotation of the motor 21 is reduced in speed by the speed reduction mechanism 22, and the rotating force reduced in speed is transmitted to the wheel steering shaft 15 via the pinion shaft 23 as an assisting force. The wheel steering shaft 15 moves along the vehicle width direction with rotation of the motor 21.

The EPS 10 includes a control apparatus 50. The control apparatus 50 controls the motor 21 based on results detected by various sensors. The sensors include a torque sensor 51, a vehicle speed sensor 52, and a rotational angle sensor 53. The torque sensor 51 detects a steering torque $T_h$ based on the amount of torsion of the steering shaft 13. The steering torque is a torque that acts on the steering shaft 13 through a rotating operation of the steering wheel 11. The vehicle speed sensor 52 detects a vehicle speed V. The rotational angle sensor 53 is provided in the motor 21. The rotational angle sensor 53 detects a rotation angle $\theta_m$ of the motor 21. The control apparatus 50 executes assist control to generate an assisting force according to a steering torque $T_h$ through energization control over the motor 21. The control apparatus 50 controls an electric power supplied to the motor 21, based on a steering torque $T_h$ detected through the torque sensor 51, a vehicle speed V detected through the vehicle speed sensor 52, and a rotation angle $\theta_m$ detected through the rotational angle sensor 53. The control apparatus 50 may include an electronic control unit.

A vehicle may be equipped with an autonomous driving system that implements various driving support functions for further improving its safety or convenience or automated driving functions with which the system replaces driving operation. In this case, the vehicle is equipped with a host control apparatus 500 that generally controls the control apparatuses of various onboard systems. The host control apparatus 500 determines an optimal control method based on the status of the vehicle at any given time, and individually instructs various onboard control apparatuses to execute control in accordance with the determined control method.

The host control apparatus 500 intervenes in steering control that is executed by the control apparatus 50. The host control apparatus 500 switches between an on state (enabled) and off state (disabled) of its own autonomous driving control function in response to operation of a switch (not shown) provided at a driver seat, or the like. The autonomous driving control function also includes a driving support control function for further improving the safety or convenience of the vehicle.

The host control apparatus 500, for example, computes an additional angle command value as a command value $\theta^*$ for causing the vehicle to travel in a target lane in a state where the autonomous driving control function is in the on state. The additional angle command value is a target value of pinion angle $\theta_p$ (an angle to be added to the current pinion angle $\theta_p$) that is required to cause the vehicle to travel along a lane for a travel status of the vehicle at any given time. The control apparatus 50 controls the motor 21 by using the command value $\theta^*$ computed by the host control apparatus 500. The pinion angle $\theta_p$ is convertible to the wheel steering angle $\theta_t$ of the steered wheels 12.

Figure 2:
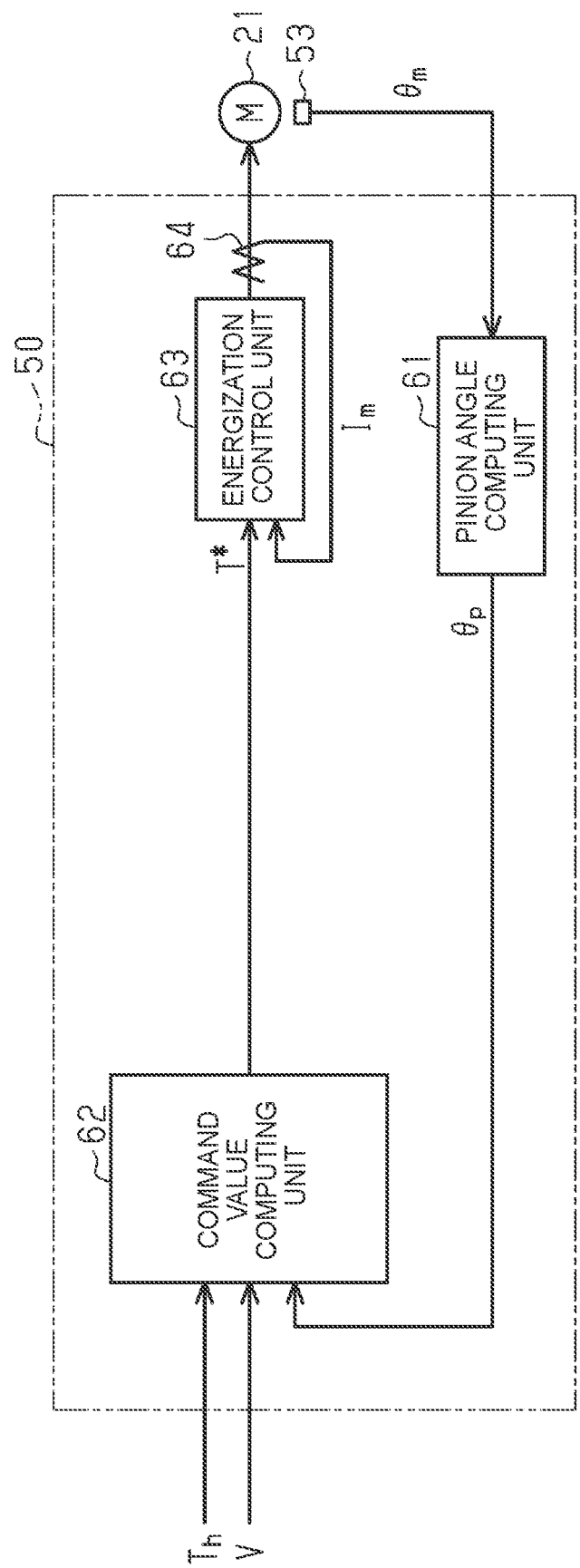
FIG. 2 is a control block diagram of the steering control apparatus according to the embodiment.

Next, the control apparatus 50 will be described in detail. As shown in FIG. 2, the control apparatus 50 includes a pinion angle computing unit 61, a command value computing unit 62, and an energization control unit 63.

The pinion angle computing unit 61 computes a pinion angle $\theta_p$ that is a rotation angle of the pinion shaft 23, based on a rotation angle $\theta_m$ of the motor 21, detected through the rotational angle sensor 53. The pinion angle computing unit 61 computes a pinion angle $\theta_p$ by, for example, dividing the rotation angle $\theta_m$ of the motor 21 by a speed reducing ratio of the speed reduction mechanism 22.

The pinion angle computing unit 61 may compute the rotation angle of the pinion shaft 14 as a pinion angle $\theta_p$. In this case, the pinion angle computing unit 61 computes a pinion angle $\theta_p$ that is the rotation angle of the pinion shaft 14 by, for example, dividing the rotation angle $\theta_m$ of the motor 21 by a speed reducing ratio of components from the motor 21 to the pinion shaft 14.

The command value computing unit 62 computes an assist command value T* based on a steering torque $T_h$ detected through the torque sensor 51 and a vehicle speed V detected through the vehicle speed sensor 52. The assist command value T* indicates an assist torque that is a rotating force to be generated by the motor 21. The command value computing unit 62 computes an assist command value T* having a greater absolute value as the absolute value of the steering torque $T_h$ increases or as the vehicle speed V decreases.

The energization control unit 63 supplies the motor 21 with an electric power according to the assist command value T*. Specifically, the energization control unit 63 is configured as follows. The energization control unit 63 computes a current command value that is a target value of current to be supplied to the motor 21, based on the assist command value T*. The energization control unit 63 detects a current $I_m$ to be supplied to the motor 21, through a current sensor 64 provided in a power supply line to the motor 21. The energization control unit 63 finds a deviation between the current command value and the actual value of current $I_m$, and controls an electric power supplied to the motor 21 such that the deviation is minimized (feedback control over the current $I_m$). Thus, the motor 21 generates a torque according to the assist command value T*.

Figure 3:
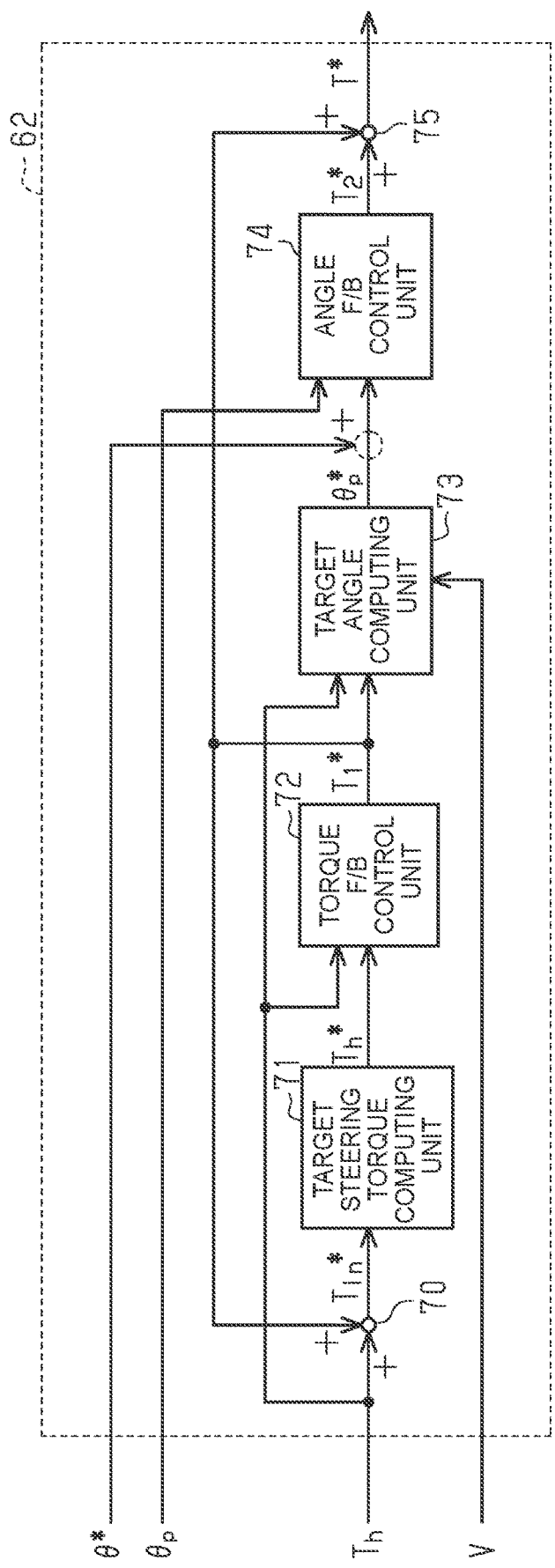
FIG. 3 is a control block diagram of a command value computing unit in the embodiment.

Next, the command value computing unit 62 will be described in detail. As shown in FIG. 3, the command value computing unit 62 includes an adder 70, a target steering torque computing unit 71, a torque feedback control unit 72, a target angle computing unit 73, an angle feedback control unit 74, and an adder 75.

The adder 70 computes an input torque $T_{in}$* as a torque to be applied to the steering shaft 13, by adding a steering torque $T_h$ detected through the torque sensor 51 and a first assist torque $T_1$* computed by the torque feedback control unit 72.

The target steering torque computing unit 71 computes a target steering torque $T_h$* based on the input torque $T_{in}$* computed by the adder 70. The target steering torque $T_h$* is a target value of steering torque $T_h$ to be applied to the steering wheel 11. The target steering torque computing unit 71 computes the target steering torque $T_h$* having a greater absolute value as the absolute value of the input torque $T_{in}$* increases.

The torque feedback control unit 72 acquires the steering torque $T_h$ detected through the torque sensor 51 and the target steering torque $T_h$* computed by the target steering torque computing unit 71. The torque feedback control unit 72 computes a first assist torque $T_1$* by executing feedback control over the steering torque $T_h$ to cause the steering torque $T_h$ detected through the torque sensor 51 to follow the target steering torque $T_h$*.

The target angle computing unit 73 acquires the steering torque $T_h$ detected through the torque sensor 51, the first assist torque $T_1$* computed by the torque feedback control unit 72, and the vehicle speed V detected through the vehicle speed sensor 52. The target angle computing unit 73 computes a target pinion angle $\theta_p$* based on the acquired steering torque $T_h$, first assist torque $T_1$*, and vehicle speed V. The target pinion angle $\theta_p$* is a target value of rotation angle of the pinion shaft 23.

When an additional angle command value is computed as the command value θ* through execution of the autonomous driving control function by the host control apparatus 500, the command value θ* is added to the target pinion angle $\theta_p$* computed by the target angle computing unit 73. A final target pinion angle $\theta_p$* to which the command value θ* has been added is supplied to the angle feedback control unit 74.

The angle feedback control unit 74 acquires the target pinion angle $\theta_p$* computed by the target angle computing unit 73 and the actual pinion angle $\theta_p$ computed by the pinion angle computing unit 61. The angle feedback control unit 74 computes a second assist torque $T_2$* by executing feedback control over the pinion angle $\theta_p$ to cause the actual pinion angle $\theta_p$ to follow the target pinion angle $\theta_p$*.

The adder 75 computes an assist command value T* by adding the first assist torque $T_1$* computed by the torque feedback control unit 72 and the second assist torque $T_2$* computed by the angle feedback control unit 74. When a current based on the assist command value T* is supplied to the motor 21, the motor 21 generates a torque according to the assist command value T*.

Figure 4:
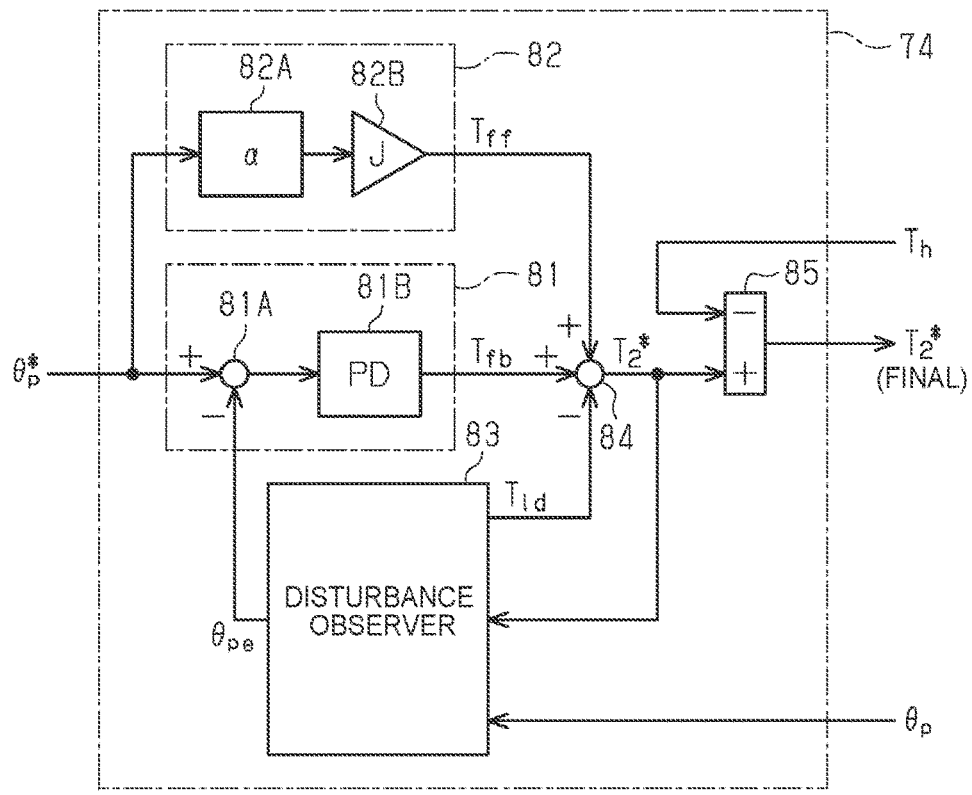
FIG. 4 is a control block diagram of an angle feedback control unit in the embodiment.

Next, the angle feedback control unit 74 will be described in detail. As shown in FIG. 4, the angle feedback control unit 74 includes a feedback control unit 81, a feedforward control unit 82, a disturbance observer 83, and an adder 84.

The feedback control unit 81 is provided to bring a pinion angle estimated value $\theta_{pe}$ close to the target pinion angle $\theta_p$*. The pinion angle estimated value $\theta_{pe}$ is an estimated value of pinion angle $\theta_p$, computed by the disturbance observer 83. The feedback control unit 81 includes a subtractor 81A and a PD control unit (proportional plus derivative control unit) 81B. The subtractor 81A computes a deviation $\Delta\theta_p$ ($=\theta_p$*$-\theta_{pe}$) between the target pinion angle $\theta_p$* and a pinion angle estimated value $\theta_p$e computed by the disturbance observer 83. The PD control unit 81B computes a feedback control torque $T_b$ by performing proportional plus derivative operation on the deviation Δθp computed by the subtractor 81A. In other words, the feedback control torque $T_h$ is the sum of an output value of a proportional control element and an output value of a derivative control element for an input of the deviation Δθp.

The feedforward control unit 82 is provided to improve the response of control by compensating a delay of response due to the inertia of the EPS 10. The feedforward control unit 82 includes an angular acceleration computing unit 82A and a multiplication unit 82B. The angular acceleration computing unit 82A computes a target pinion acceleration a ($=d^2\theta_p$*$/dt^2$) by evaluating the second derivative of the target pinion angle $\theta_p$*. The multiplication unit 82B computes a feedforward control torque $T_{ff}$ ($=J\cdot\alpha$) as an inertia compensation value by multiplying an inertia J of the EPS 10 by the target pinion angular acceleration a computed by the angular acceleration computing unit 82A. The inertia J is found from, for example, the physical model of the EPS 10.

The disturbance observer 83 is provided to estimate and compensate a disturbance torque. A disturbance torque is a nonlinear torque that occurs as a disturbance in an actual plant (EPS 10) to be actually controlled, and is a torque that affects the pinion angle $\theta_p$, other than a torque to be generated by the motor 21. The disturbance observer 83 computes a disturbance torque estimated value Tia as a disturbance torque compensation value, and a pinion angle estimated value $\theta_{pe}$ based on a second assist torque $T_2$* and an actual pinion angle $\theta_p$. The second assist torque $T_2$* is a target value of the plant. The actual pinion angle $\theta_p$ is an output of the plant.

The disturbance observer 83 computes a disturbance torque estimated value Tia by multiplying a predetermined observer gain by the value of a difference between the pinion angle $\theta_p$ computed by the pinion angle computing unit 61 and a pinion angle estimated value $\theta_p$, (described later) that is an estimated value of the pinion angle $\theta_p$. The disturbance observer 83 computes a pinion angle estimated value $\theta_{pe}$ by multiplying the inverse number of the inertia of the EPS 10 by a value obtained by adding the disturbance torque estimated value $T_{ld}$ and a second assist torque $T_2^*$ computed by the adder 84 and evaluating the second integral of the multiplied result. The disturbance observer 83 may be configured to compute a disturbance torque estimated value $T_{ld}$ and a pinion angle estimated value $\theta_{pe}$ by using an assist command value $T^*$ instead of the second assist torque $T_2^*$.

The adder 84 computes a second assist torque $T_2^*$ ($=T_{fb}+T_{ff}-T_{ld}$) by subtracting the disturbance torque estimated value $T_{ld}$ from a value obtained by adding the feedforward control torque $T_{ff}$ to the feedback control torque $T_{fb}$. Thus, the second assist torque $T_2^*$ for which the inertia and the disturbance torque are compensated is obtained. An assist command value $T^*$ based on the second assist torque $T_2^*$ is used, so further higher-accuracy motor control is executed.

Figure 5:
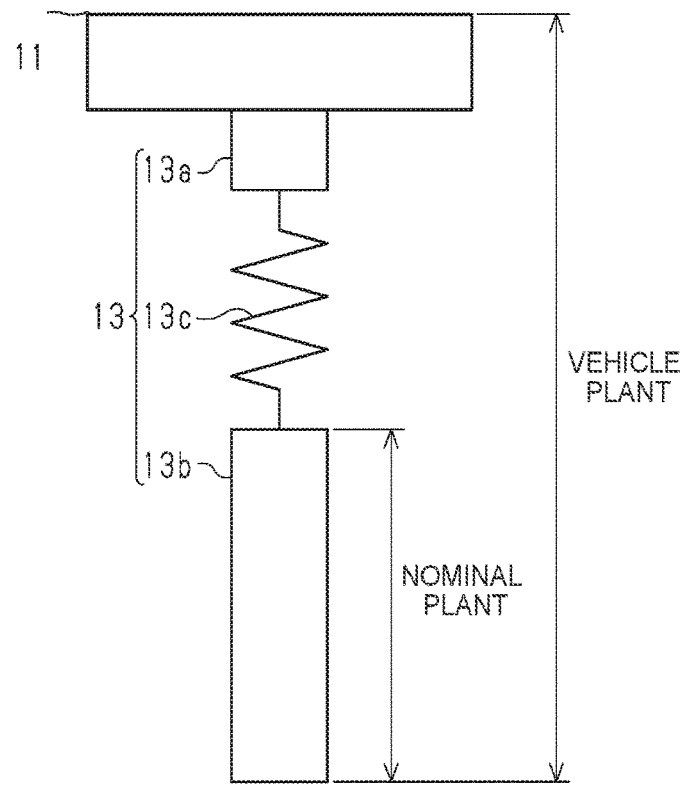
FIG. 5 is a schematic diagram showing a physical model of the electric power steering in the embodiment.

The disturbance observer 83 estimates a disturbance torque based on a nominal plant that is a model simulating an actual plant (EPS 10) to be actually controlled. As shown in FIG. 5, in a vehicle plant that is the vehicle in which the actual plant is installed, the steering wheel 11 is coupled to the steering shaft 13. The steering shaft 13 includes an input shaft 13a, an output shaft 13b, and a torsion bar 13c. The input shaft 13a is coupled to the steering wheel 11. The output shaft 13b is coupled to the wheel steering shaft 15 via the pinion shaft 14. The torsion bar 13c couples the input shaft 13a and the output shaft 13b. The torque sensor 51 detects a torque applied to the steering shaft 13, based on the amount of torsion of the torsion bar 13c provided in the middle of the steering shaft 13.

The nominal plant includes a portion downstream of the torsion bar 13c in the steering shaft 13, that is, the output shaft 13b, the pinion shaft 14, and the wheel steering shaft 15. Therefore, an inertia in the nominal plant (nominal inertia) is the inertia of the output shaft 13b, the pinion shaft 14, and the wheel steering shaft 15, that is, a portion downstream of the torsion bar 13c. For this reason, when viewed from the disturbance observer 83, a torque caused by the inertia of the steering wheel 11 that is a portion upstream of the torsion bar 13c is a disturbance. The disturbance observer 83 basically compensates an inertia torque detected through the torque sensor 51, as a disturbance.

However, when autonomous driving control is being executed, there are the following concerns. When autonomous driving control is being executed, an entity that operates the steering wheel 11 is not a driver and is a control apparatus for autonomous driving control. For this reason, it is conceivable that a driver does not actively operate the steering wheel 11 and drives the vehicle in a hand-off state where hands are off the steering wheel 11. In this hand-off state, the inertia of the steering wheel 11 sometimes matters.

When, for example, the vibrational frequency of the steering wheel 11 reaches a specific frequency range, resonance due to the inertia of the steering wheel 11 occurs. As a result of occurrence of the resonance, the difference between the frequency characteristics of the vehicle plant including the steering wheel 11 and the frequency characteristics of the nominal plant of the disturbance observer 83, not including the steering wheel 11, further increases. For this reason, the disturbance observer 83 may be not able to compensate the inertia torque of the steering wheel 11 as a disturbance torque. Therefore, there are concerns about a decrease in the follow-up performance of an actual pinion angle $\theta_p$ for a target pinion angle $\theta_p^*$.

In the present embodiment, to cancel out the influence of resonance due to the inertia of the steering wheel 11 in a hand-off state, the following configuration is employed as the angle feedback control unit 74.

As shown in FIG. 4, the angle feedback control unit 74 includes a subtractor 85. The subtractor 85 acquires the steering torque $T_h$ detected through the torque sensor 51, and the second assist torque $T_2^*$ computed by the adder 84. The subtractor 85 calculates a final second assist torque $T_2^*$ used to control the motor 21, by subtracting the steering torque $T_h$ from the second assist torque $T_2^*$ computed by the adder 84.

Therefore, according to the present embodiment, the following operation and advantageous effects are obtained. When autonomous driving control is being executed, the inertia torque of the steering wheel 11 is detected as a steering torque $T_h$ through the torque sensor 51 while the vehicle is traveling in a hand-off state. The steering torque $T_h$ as the inertia torque of the steering wheel 11, which cannot be sufficiently compensated by the disturbance observer 83, is subtracted from the second assist torque $T_2^*$ computed by the adder 84. As a result, a final second assist torque $T_2^*$ for which the inertia torque has been compensated is obtained. The motor 21 is controlled by using an assist command value $T_2^*$ based on the final second assist torque $T_2^*$, so the follow-up performance of an actual pinion angle $\theta_p$ for a target pinion angle $\theta_p^*$ and, by extension, vehicle response are ensured. In other words, the influence of resonance due to the inertia of the steering wheel 11 in a hand-off state is cancelled out.

Other Embodiments

The above-described embodiments may be modified as follows. The control apparatus 50 may be applied to an EPS that applies an assisting force to the steering shaft 13, other than the EPS 10 that applies an assisting force to the wheel steering shaft 15. In this case, as represented by the alternate long and two-short dashed line in FIG. 1, the motor 21 is, for example, coupled to the steering shaft 13 via the speed reduction mechanism 22. The pinion shaft 23 may be omitted. In this case, the host control apparatus 500 may compute a target value of steering angle $\theta_s$ (angle to be added to the current steering angle $\theta_s$) as a command value $\theta^*$ for causing the vehicle to travel in a target lane in a state where the autonomous driving control function is on. The steering angle $\theta_s$ can be computed based on the rotation angle $\theta_m$ of the motor 21 that rotates in synchronization with the steering shaft 13.

When the disturbance observer 83 uses integral operation in computing a pinion angle estimated value $\theta_{pe}$, the disturbance estimation performance of the disturbance observer 83 may decrease due to a discretization error in a high frequency range. In this case, a bilinear transformation relation may be used for discrete integral operation.

The feedforward control unit 82 may be omitted from the angle feedback control unit 74. The angle feedback control unit 74 may be configured to subtract the steering torque $T_h$ from the disturbance torque estimated value $T_{ld}$ computed by the disturbance observer 83. The steering torque $T_h$ is the inertia torque of the steering wheel 11. With this configuration as well, the second assist torque $T_2^*$ for which the inertia torque has been compensated is obtained. The disturbance torque estimated value $T_{ld}$ for which the inertia torque of the steering wheel 11 has been compensated is obtained by subtracting the inertia torque of the steering wheel 11 from the disturbance torque estimated value $T_{ld}$ computed by the disturbance observer 83. For this reason, the feedback control torque Ta corrected by the disturbance torque estimated value $T_{ld}$ and, by extension, the second assist torque $T_2^*$ reflecting the corrected feedback control torque $T_{fb}$, of which the inertia torque of the steering wheel 11 has been compensated, are obtained. Therefore, the influence of torque due to the inertia of the steering wheel 11 is suppressed.

The following configuration may be employed as the command value computing unit 62. The command value computing unit 62 includes a computing unit that computes a first assist torque $T_1^*$ based on a steering torque $T_h$ and a vehicle speed V, instead of the target steering torque computing unit 71 and the torque feedback control unit 72, shown in FIG. 3. The computing unit computes a first assist torque $T_1^*$ by using, for example, a three-dimensional map that defines the relationship between steering torque $T_h$ and first assist torque $T_1^*$ according to a vehicle speed V instead of performing feedback control over the steering torque $T_h$.

During execution of autonomous driving control by the host control apparatus 500, the command value computing unit 62 may use a selected one of a target pinion angle $\theta_p^*$ for autonomous driving, computed by the host control apparatus 500, and a target pinion angle $\theta_p^*$ computed by the target angle computing unit 73. The target pinion angle $\theta_p^*$ for autonomous driving is not an angle to be added to a current pinion angle $\theta_p$ and is an ideal angle according to a travel status of the vehicle.

The adder 75 shown in FIG. 3 may be omitted from the command value computing unit 62. In this case, a second assist torque $T_2^*$ computed by the angle feedback control unit 74 is used as an assist command value $T^*$.

Other Technical Idea

Next, a technical idea that can be obtained from the embodiment will be described below. The motor is to generate an assisting force that is a force for assisting in operating a steering wheel.

What is claimed is:

1. A steering control apparatus that controls a motor used to turn a steered wheel of a vehicle, which synchronizes with a steering wheel, based on a command value, the command value being computed according to a target angle of an angle convertible to a wheel steering angle of the steered wheel, the target angle being determined by an onboard host control apparatus, the steering control apparatus comprising:
   an electronic control unit configured to:
      compute a feedback control torque to be reflected in the command value through execution of feedback control, the feedback control is control to cause a pinion angle to follow the target angle, the pinion angle is the angle convertible to the wheel steering angle and detected through a first sensor, the feedback control torque being computed by a subtractor configured to compute a deviation between the target angle and a pinion angle estimated value computed by a disturbance observer;
      compute a disturbance torque by multiplying a predetermined observer gain by a value of a difference between the pinion angle and a pinion angle estimated value that is an estimated value of the pinion angle, the disturbance torque being other than a torque to be generated by the motor and affecting the pinion angle, the pinion angle estimated value computed by multiplying an inverse number of an inertia of an electronic power steering by a value obtained by adding a disturbance torque estimated value and an assist torque or an assist command value, and evaluating a second integral of a result of the multiplying;
      correct the computed feedback control torque by using the computed disturbance torque; and
      in an automatic driving mode, subtract an applied torque to be applied to the steering wheel and detected through a second sensor from the command value reflecting the corrected feedback control torque,
   wherein the automatic driving mode is a mode where an entity that operates the steering wheel is not a driver.

2. The steering control apparatus according to claim 1, wherein the electronic control unit is configured to subtract the applied torque from the computed disturbance torque.

3. The steering control apparatus according to claim 1, wherein the electronic control unit is configured to:
   compute a feedforward control torque based on a second time derivative of the target angle; and
   subtract the disturbance torque from a value obtained by adding the feedforward control torque to the feedback control torque.

4. The steering control apparatus according to claim 1, wherein
   the electronic control unit is configured to compute a target pinion acceleration to compensate for a delay response due to a steering inertia, and
   the feedback control torque is computed based on the target pinion acceleration.

* * * * *